United States Patent [19]

Tanaka

[11] 4,312,127
[45] Jan. 26, 1982

[54] CUTTING TOOL

[75] Inventor: Minoru Tanaka, Higashi-Osaka, Japan

[73] Assignee: Hanazono Kogu Kabushiki Kaisha, Osaka, Japan

[21] Appl. No.: 160,150

[22] Filed: Jun. 17, 1980

[30] Foreign Application Priority Data

Aug. 23, 1979 [JP] Japan .......................... 54-116522[U]
Aug. 23, 1979 [JP] Japan .......................... 54-116523[U]
Dec. 22, 1979 [JP] Japan .......................... 54-178341[U]

[51] Int. Cl.$^3$ ........................ B23D 21/06; B26D 3/16
[52] U.S. Cl. ......................................... 30/92; 30/250
[58] Field of Search .................... 30/92, 251, 250, 192

[56] References Cited

U.S. PATENT DOCUMENTS

| | | | |
|---|---|---|---|
| 3,210,844 | 10/1965 | Tontscheff | 30/250 |
| 3,885,309 | 5/1975 | Lund | 30/250 |
| 4,084,317 | 4/1978 | Nakamura | 30/251 |
| 4,094,064 | 6/1978 | Nishikawa | 30/92 |
| 4,176,450 | 12/1979 | Muromoto | 30/92 |
| 4,178,682 | 12/1979 | Sadauskas | 30/251 |
| 4,186,484 | 2/1980 | Tanaka | 30/92 |

Primary Examiner—Jimmy C. Peters
Attorney, Agent, or Firm—Armstrong, Nikaido, Marmelstein & Kubovcik

[57] ABSTRACT

A cutting tool comprising a movable blade having a ratchet wheel portion, a movable handle reciprocally movable to cause a drive pawl in engagement with the wheel portion to intermittently drive the movable blade in a cutting direction, and a retaining pawl in engagement with the wheel portion to prevent the movable blade from turning in a direction opposite to the cutting direction under the action of an elastic pulling member during the turn of the movable handle. After a workpiece supported on a receiving portion of a stationary handle has been cut, the movable handle is turned in the opposite direction slightly beyond the range of its cutting movement to disengage the pawls from the ratchet wheel portion and cause the elastic pulling member to return the movable blade to its fully opened position.

15 Claims, 9 Drawing Figures

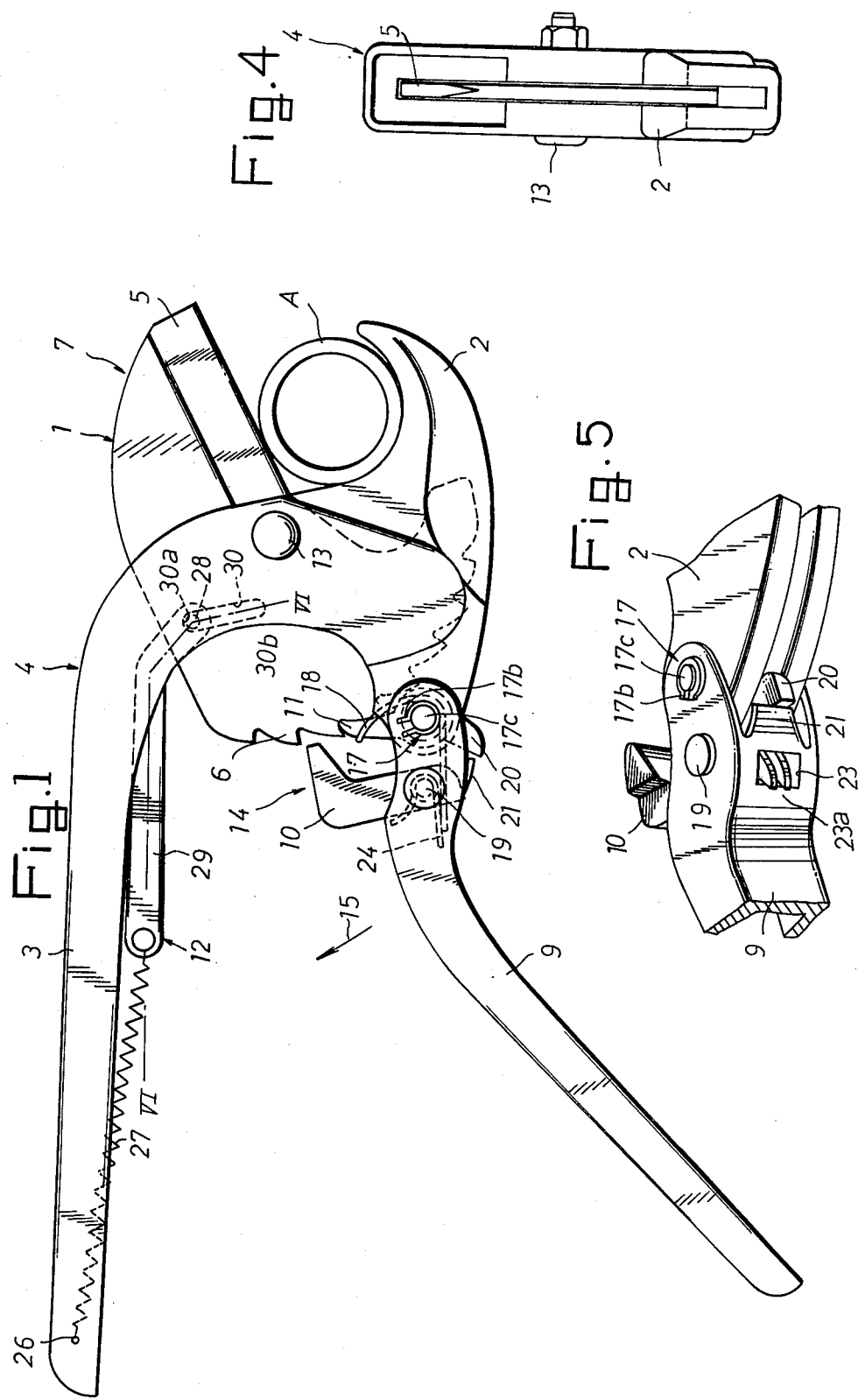

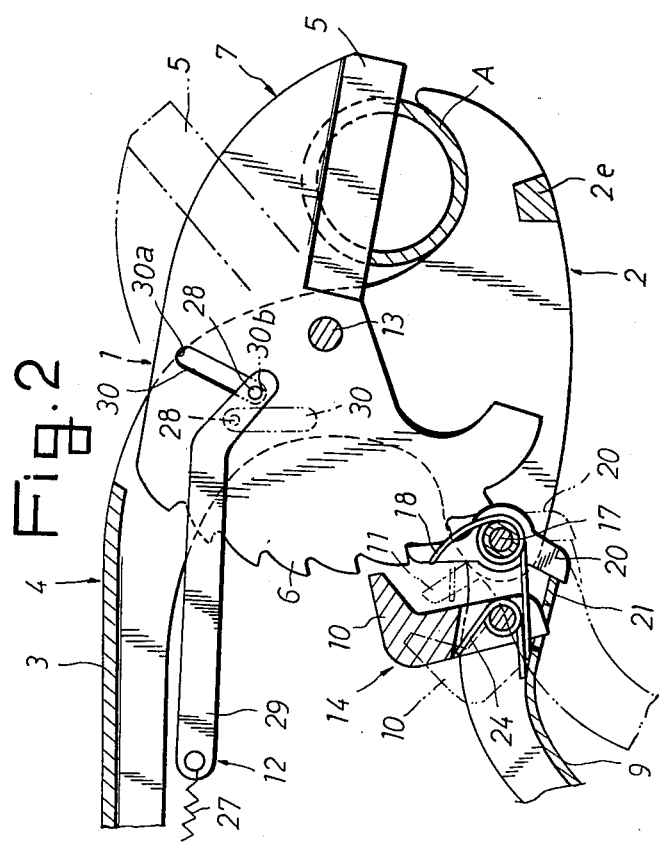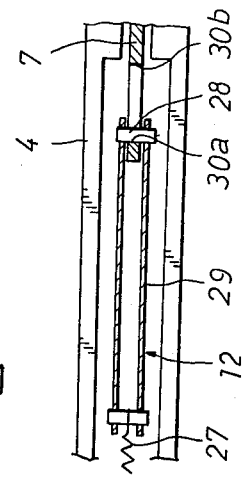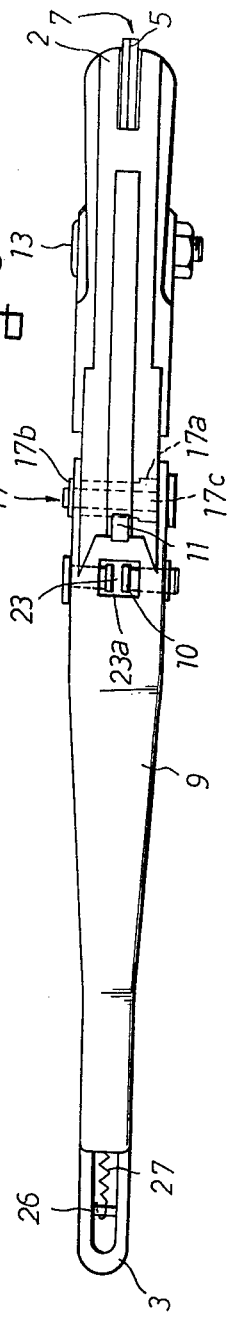

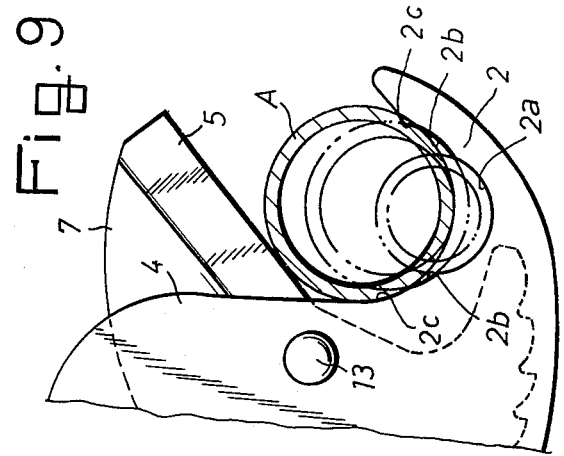
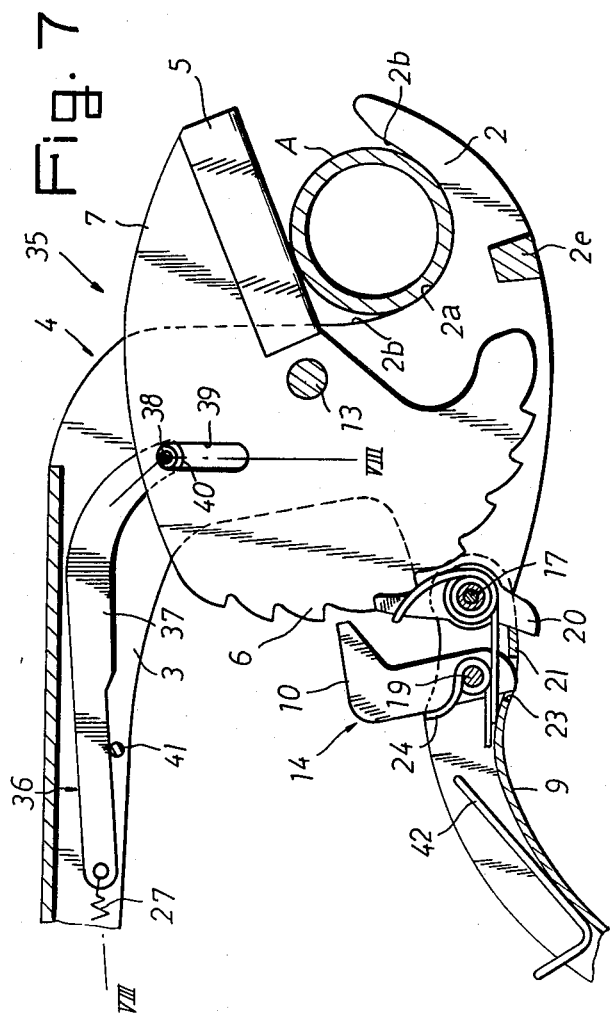
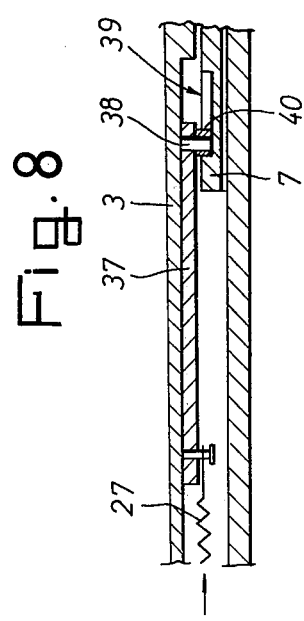

CUTTING TOOL

BACKGROUND OF THE INVENTION

The present invention relates to a cutting tool for cutting plastics, aluminum or like pipes, electric cables, thick wires, etc.

Tools of this type heretofore known include the cutting pliers disclosed in U.S. Pat. No. 3,210,844. The cutting pliers comprise a ratchet wheel turnable by the turn of a movable handle through a ratchet dog and a movable cutting jaw having a toothed portion meshing with the ratchet wheel and turnable by the wheel in the cutting direction. The movable cutting jaw is turned in the opposite direction by a return tension spring, with a retaining pawl preventing the ratchet wheel from turning in the opposite direction in engagement therewith.

With the conventional tool described, the movable cutting jaw must be returned to its fully opened position by two independent actions, namely, by turing the movable handle in the direction opposite to the cutting direction beyond the range of cutting action, and by intentionally turning the retaining pawl out of engagement with the ratchet wheel. Further when these two actions are performed at the same time, the return tension spring abruptly returns the movable cutting jaw to its fully opened position, hence very hazardous.

SUMMARY OF THE INVENTION

This invention has overcome these problems substantially completely.

An important object of the invention is to provide a cutting tool comprising a drive pawl for intermittently driving a movable blade by the reciprocation of a movable handle and a retaining pawl for preventing the return of the movable blade, the drive pawl and the retaining pawl being disengageable from the movable blade to permit return of the movable blade merely by turning the movable handle in a direction opposite to the cutting direction slightly beyond the range of its cutting movement.

Another important object of the invention is to provide a cutting tool in which the returning force of means for returning the movable blade is prevented from increasing with the turn of the movable blade in the cutting direction so as to render the cutting blade turnable with reduced resistance and returnable in a gentle movement.

Another object of the invention is to provide a cutting tool having a workpiece receiving portion formed with a plurality of receiving faces by which workpieces of varying sizes can be held substantially in intimate contact therewith.

Other objects and advantages of the invention will become apparent from the following detailed description with reference to the accompanying drawings.

BRIEF DESCRIPTION OF THE DRAWINGS

FIG. 1 is a side elevation showing a cutting tool according to a first embodiment of the invention;

FIG. 2 is a fragmentary side elevation in vertical section showing the cutting tool of FIG. 1;

FIG. 3 is a bottom view showing the cutting tool;

FIG. 4 is a front view showing the cutting tool;

FIG. 5 is a fragmentary perspective view showing ratchet means and release means;

FIG. 6 is a view in section taken along the line VI—VI in FIG. 1;

FIG. 7 is a fragementary side elevation in vertical section showing a second embodiment of the invention;

FIG. 8 is a view in section taken along the line VIII—VIII in FIG. 7; and

FIG. 9 is a side elevation showing a modification of the receiving portion of the second embodiment.

DESCRIPTION OF THE PREFERRED EMBODIMENTS

With reference to FIGS. 1 to 6 showing a first embodiment of the invention, a cutting tool 1 generally comprises a stationary handle 4 having a receiving portion 2 and a handle portion 3, a movable blade 7 having a cutting edge 5 and a ratchet wheel portion 6, a movable handle 9 turnably supported by a pivot 17 on the stationary handle 4, a drive pawl 10 pivotably supported by a pin 19 on the movable handle 9 and engageable with the rachet wheel portion 6, a retaining pawl 11 pivoted to the stationary handle 4 and engageable with the wheel portion 6, and returning means 12 provided between the handle portion 3 and movable blade 7.

The receiving portion 2 of the stationary handle 4 at its head is curved for receiving a hollow cylindrical workpiece A. The movable blade 7, which is pivoted to the stationary handle 4 as at 13, turns in a direction to cut the workpiece A in cooperation with the receiving portion 2. The drive pawl 10 and the retaining pawl 11 provide ratchet means 14 for intermittently driving the movable blade 7. The movable handle 9, when turned about the pivot 17 in the cutting direction 15, causes the drive pawl 10 to drive the ratchet wheel portion 6 by one tooth in engagement therewith. When the movable handle 9 is turned in a direction opposite to the cutting direction, the drive pawl 10 is shifted to the next tooth of the wheel portion 6. In the meantime, the retaining pawl 11 in engagement with the wheel portion 6 prevents the movable blade 7 from returning under the action of the returning means 12. The range of turn of the movable handle 9 needed for driving the wheel portion 6 with the drive pawl 10 by one tooth at a time is the range of the cutting movement.

The movable handle 9 is U-shaped in cross section and has a bifurcated forward end, at which the handle 9 is pivoted to the stationary handle 4 as at 17. The pivot 17 comprises a threaded tube 17a screwed in the stationary handle 4 and an inner pin 17c extending through the tube 17a and held in place by a retaining ring 17b. The movable handle 9 is fitted to the inner pin 17c, while the retaining pawl 11 is turnably mounted on the threaded tube 17a. The retaining pawl 11 is biased by a spring 18 clockwise in FIG. 1 into engagement with the rachet wheel portion 6.

The retaining pawl 11 has an engaging portion 20 projecting outward beyond the head of the stationary handle 4, while the movable handle 9 is provided at its bifurcated end with a tonguelike operating portion 21. The movable handle 9, when turned slightly in the direction opposite to the cutting direction 15, brings the operating portion 21 into engagement with the engaging portion 20, thereby turning the retaining pawl 11 counterclockwise in FIG. 1 out of engagement with the wheel portion 6. Thus the engaging portion 20 and the operating portion 21 constitute release means for the retaining pawl 11.

When intermittently driving the movable blade 7 with the drive pawl 10, the movable handle 9 is turned reciprocally through a specified angle. The operating portion 21 is adapted to engage the engaging portion 20 when the movable handle 9 is turned in the direction opposite to the cutting direction slightly beyond the range of the cutting movement of the handle, so that the retaining pawl 11 will not be disengaged from the wheel portion 6 during usual cutting operation but can be disengaged with extreme ease merely by returning the movable handle slightly to excess.

The movable handle 9 has an opening 23 with the rear end of the drive pawl 10 positioned therein. One wall edge defining the opening 23 serves as a stopper 23a engageable with the pawl 10, such that when the movable handle 9 turns in the direction opposite to the cutting direction within the range of its cutting movement, the drive pawl 10, which is biased by a spring 24 toward the wheel portion 6, comes into engagement at its rear end with the stopper 23a of the handle 9 and is thereby prevented from turning beyond a predetermined angle. Consequently when the movable handle 9 turns in the opposite direction beyond the range of its cutting movement, both the drive pawl 10 and the retaining pawl 11 are disengaged from the ratchet wheel portion 6 (as indicated in phantom lines in FIG. 2).

The returning means 12 comprises a tension spring 27 having one end connected to a pin 26 on the rear end of the stationary handle portion 3 U-shaped in cross section, a link 29 having one end connected to the other end of the spring 27 and the other end coupled to the movable blade 7 by a pin 28, and a slot (guide portion) 30 formed in the movable blade 7 and having the pin 28 slidably received therein. The link 29 is composed of two thin plates, bent near the movable blade 7 and shaped so as not to project outward from the stationary handle portion 3. The elastic pulling member made up of the spring 27 and the link 29 may consist only of a spring connected to the pin 28 at its one end.

When the movable handle 9 in the position shown in FIG. 1 is reciprocally turned, causing the drive pawl 10 to intermittently drive the movable blade 7, the pin 28 at one end 30a of the slot 30 moves away from the pin 26 with the turn of the movable blade 7 (see FIG. 2). When the distance from the pin 26 to the other end 30b of the slot 30 becomes shorter than the distance from the pin 26 to the end 30a of the slot 30, the pin 28 which is pulled by the spring 27 shifts from one end 30a to the other end 30b, consequently reducing the stretch of the elastic pulling member composed of the spring 27 and the link 29 and therefore temporarily decreasing the tension acting to return the movable blade 7. Thus the blade 7 is turnable with reduced resistance and can be intermittently driven with ease. Further when released from the retaining pawl 11 after the workpiece A has been cut, the movable blade 7 returns gently without producing impact.

Thus the elastic link assembly is shifted at its one end where it is connected to the movable blade 7, by the guide portion 30, whereby the tension of the assembly which tends to increase with the turn of the blade 7 is reduced to render the blade 7 returnable correspondingly gently. When the returning means 12 acts to turn the blade 7 in the direction opposite to the cutting direction, the pin 28 shifts from the other end 30b to the end 30a in the course of the turn, permitting the movable blade 7 to turn to its final position where it is in contact with a stopper 2e, namely, to its fully opened position.

With reference to FIGS. 7 and 8 showing a second embodiment of the invention, a cutting tool 35 generally resembles the cutting tool 1 of the first embodiment, but slightly differs therefrom in respect of the receiving portion, drive pawl, retaining pawl, returning means, etc.

The receiving portion 2 for workpieces A is formed with a receiving face 2a of small diameter and receiving faces 2b of larger diameter for receiving two kinds of workpieces A of different diameters substantially in intimate fitting contact therewith. This enables the movable blade 7 to effectively bite into and easily cut the workpieces A, for example, without permitting deformation of the workpieces.

FIG. 9 shows a modification of the receiving portion. This receiving portion 2 has receiving faces 2a, 2b and 2c for holding three kinds of workpieces A of varying diameters substantially in intimate contact therewith.

The receiving portions 2a, 2b, or the like need not always be adapted for completely intimate contact with workpieces A. Since these faces can support workpieces satisfactorily when having circular arc shapes approximately in conformity with the shapes of workpieces, the receiving portion can be adapted to receive a wider variety of workpieces more effectively when formed with two or three kinds of receiving faces than when having only one kind of receiving face. The receiving faces 2a and 2b can be made angular for receiving square workpieces.

With reference to FIGS. 7 and 8, returning means 36, like the returning means 12, comprises an elastic pulling member composed of a spring 27 and a link 37, and a guide portion 39 for a pin 38. The link 37 is in the form of a bar having a circular arc forward end. The guide portion 39 is in the form of a bottomed groove formed in the movable blade 7. The pin 38 carries at its free end a roller 40 slidably engaged in the guide portion 39. The returning member 12 is prevented from disengagement from the blade 7 by being disposed within the stationary handle portion 3.

Indicated at 41 is a pin for limiting the position of the link 37. Although the pin 38 turns and shifts along the guide portion 39 with the turn of the movable blade 7, the link 37 which is angularly shiftable as supported by the pin 41, will not project outward from the stationary handle portion 3 which is U-shaped in cross section and therefore will not contact the hand of the user holding the stationary handle 4.

Indicated at 42 in FIG. 7 is a holder pivoted at its one end to the movable handle 9. The holder 42 has an L-shaped free end which is engageable with the pin 41 to hold the movable handle 9 to the stationary handle 4.

According to the invention described above, the operating portion 21 is engageable with the engaging portion 20 to disengage the retaining pawl from the ratchet wheel portion and, at the same time, the drive pawl is disengageable from the wheel portion, enabling the returning means to automatically return the movable blade, only by a single action, namely, merely by turning the movable handle in a direction opposite to the cutting direction slightly beyond the range of its cutting movement, after or during cutting a workpiece. Thus the movable blade is not returnable unless the movable handle is intentionally turned in the opposite direction. This eliminates the hazard that the movable blade of the conventional device turns automatically on completion of a cutting operation, while the blade is returnable to its opened position before completion of cutting operation. Whereas the conventional tool must be handled by a single hand when the user turns the movable handle and also disengages the retaining pawl, the invention has eliminated such a difficulty.

Furthermore when the elastic pulling member of means for returning the movable blade stretches to give an increased returning force with the turn of the movable blade, the end of the pulling member where the member is connected to the blade shifts along the guide portion in the course of the turn to reduce the tension, namely, the increase of the returning force. Accordingly when the retaining pawl is to be released to return the blade after or during a cutting operation, the suppressed returning force of the returning means will not turn the blade abruptly or will not produce any impact. The blade is therefore returnable with safety. Additionally the cutting blade can be driven easily for cutting.

The receiving portion of the stationary handle which is formed with a plurality of receiving faces is adapted to support workpieces of varying sizes in intimate contact therewith, so that workpieces can be cut as supported effectively.

What is claimed is:

1. A cutting tool comprising a stationary handle formed at its head with a portion for receiving a workpiece; a movable handle pivoted at its one end to the head of the stationary handle and extending in opposed relation to the stationary handle so as to be grippable; a movable blade pivoted to the head of the stationary handle and having a cutting edge opposed to the receiving portion and a ratchet wheel portion opposed to the movable handle, the ratchet wheel portion including teeth arranged at specified spacing along its outer periphery; ratchet means including a drive pawl engageable with the ratchet wheel portion to intermittently drive the movable blade in a cutting direction when the movable handle is turned and a retaining pawl engageable with the ratchet wheel portion to prevent the movable blade from turning in a direction opposite to the cutting direction when the movable handle is turned; returning means provided between the stationary handle and the movable blade for giving the movable blade a turning force acting in the opposite direction; and release means for disengaging the drive pawl and the retaining pawl from the ratchet wheel portion solely by the turn of the movable handle when the movable handle has turned in the opposite direction beyond the range of its cutting movement.

2. A cutting tool as defined in claim 1 wherein the retaining pawl is turnably mounted on a pivot by which the end of the movable handle is pivoted to the head of the stationary handle and has an engaging portion projecting outward beyond the head, and the movable handle has a tonguelike operating portion engageable with the engaging portion to turn the retaining pawl out of engagement with the ratchet wheel portion when the movable handle turns in the opposite direction beyond the range of its cutting movement.

3. A cutting tool as defined in claim 1 wherein the drive pawl is pivoted to an intermediate portion of the movable handle and biased toward the ratchet wheel portion for engagement therewith, and the movable handle has mounted thereon a stopper for preventing the drive pawl from turning toward the ratchet wheel portion when the movable handle turns in the opposite direction beyond the range of its cutting movement.

4. A cutting tool as defined in claim 1 wherein the receiving portion is formed with a plurality of receiving faces for supporting workpieces of varying sizes substantially in intimate contact therewith.

5. A cutting tool comprising a stationary handle formed at its head with a portion for receiving a workpiece; a movable handle pivoted at its one end to the head of the stationary handle and extending in opposed relation to the stationary handle so as to be grippable; a movable blade pivoted to the head of the stationary handle and having a cutting edge opposed to the receiving portion and a ratchet wheel portion opposed to the movable handle, the ratchet wheel portion including teeth arranged at specified spacing along its outer periphery; ratchet means including a drive pawl engageable with the ratchet wheel portion to intermittently drive the movable blade in a cutting direction when the movable handle is turned and a retaining pawl engageable with the ratchet wheel portion to prevent the movable blade from turning in a direction opposite to the cutting direction when the movable handle is turned; returning means including an elastic pulling member connected between the stationary handle and the movable blade for giving the movable blade a turning force acting in the opposite direction and guide means formed in the movable blade for shifting the end of the pulling member where the member is connected to the movable blade for suppressing the turning force on the movable blade while the force increases with the turn of the blade in the cutting direction; and release means for disengaging the drive pawl and the retaining pawl from the ratchet wheel portion solely by the turn of the movable handle when the movable handle has turned in the opposite direction beyond the range of its cutting movement.

6. A cutting tool as defined in claim 5 wherein the receiving portion is formed with a plurality of circular arc receiving faces fittable to circular workpieces of varying diameters respectively.

7. A cutting tool as defined in claim 5 wherein the stationary handle has at its rear portion a handle portion, and the elastic pulling member is connected between the stationary handle portion and the movable blade, the guide means being so shiftable with the turn of the movable blade that one end of the guide means positioned closer to the stationary handle portion than the other end thereof is brought to a position where said one end is more remote from the stationary handle portion than the other end, said end of the pulling member connected to the movable blade being movable from said one end of the guide means to the other end thereof during the shift of the guide means.

8. A cutting tool as defined in claim 7 wherein the elastic pulling member comprises a link provided at its one end a pin slidable in the guide means and a tension spring connected between the other end of the link and the stationary handle portion.

9. A cutting tool as defined in claim 7 wherein the elastic pulling member is a tension spring having one end provided with a pin slidable in the guide means and the other end connected to the stationary handle portion.

10. A cutting tool as defined in claim 7 wherein the guide means is in the form of a slot extending through the movable blade.

11. A cutting tool as defined in claim 7 wherein the guide means is a bottomed groove formed in the movable blade.

12. A cutting tool as defined in claim 7 wherein the stationary handle portion is U-shaped in cross section, and the elastic pulling member is disposed within the stationary handle portion, the stationary handle portion being provided with stopper means for preventing the elastic pulling member from projecting outward from its interior.

13. A cutting tool comprising a stationary handle formed at its head with a portion for receiving a workpiece; a movable handle pivoted at its one end to the head of the stationary handle and extending in opposed relation to the stationary handle so as to be grippable; a removable blade pivoted to the head of the stationary handle and having a cutting edge opposed to the rceiving portion and a ratchet wheel portion opposed to the movable handle, the ratchet wheel portion including teeth arranged at specified spacing along its outer periphery; ratchet means including a drive pawl engageable with the ratchet wheel portion to intermittently drive the movable blade in a cutting direction when the movable handle is turned and a retaining pawl engageable with the ratchet wheel portion to prevent the movable blade from turning in a direction opposite to the cutting direction when the movable handle is turned; returning means provided between the stationary handle and the movable blade for giving the movable blade a turning force acting in the opposite direction; and release means for disengaging the drive pawl and the retaining pawl from the ratchet wheel portion by the turn of the movable handle when the movable handle has turned in the opposite direction beyond the range of its cutting movement wherein the retaining pawl is turnably mounted on a pivot by which the end of the movable handle is pivoted to the head of the stationary handle and has an engaging portion projecting outward beyond the head, and the movable handle has a tongue-like operating portion engageable with the engaging portion to turn the retaining pawl out of engagement with the ratchet wheel portion when the movable handle turns in the opposite direction beyond the range of its cutting movement.

14. A cutting tool comprising a stationary handle formed at its head with a portion for receiving a workpiece and at its rear portion a handle portion; a movable handle pivoted at its one end to the head of the stationary handle and extending in opposed relation to the stationary handle so as to be grippable; a movable blade pivoted to the head of the stationary handle and having a cutting edge opposed to the receiving portion and a ratchet wheel portion opposed to the movable handle, the ratchet wheel portion including teeth arranged at specified spacing along its outer periphery; ratchet means including a drive pawl engageable with the ratchet wheel portion to intermittently drive the movable blade in a cutting direction when the movable blade is turned and a retaining pawl engageable with the ratchet wheel portion to prevent the movable blade from turning in a direction opposite to the cutting direction when the movable handle is turned; returning means including an elastic pulling member connected between the stationary handle portion and the movable blade for giving the movable blade a turning force in the opposite direction and a guide portion formed in the movable blade for shifting the end of the pulling member where the member is connected to the movable blade for suppressing the turning force on the movable blade while the force increases with the turn of the blade in the cutting direction, the elastic pulling member comprising a link provided at one end with a pin slidable in the guide portion and a tension spring connected between the other end of the link and the stationary handle portion, the guide portion being so shiftable with the turn of the movable blade that one end of the guide portion positioned closer to the stationary handle portion than the other end thereof is brought to a position where said one end is more remote from the stationary handle portion than the other end, the pin of the link being movable slidably from said one end of the guide portion to the other end thereof during the shift of the guide portion; and release means for disengaging the drive pawl and the retaining pawl from the ratchet wheel portion by the turn of the movable handle when the movable handle has turned in the opposite direction beyond the range of its cutting movement.

15. A cutting tool comprising a stationary handle formed at its head with a portion for receiving a workpiece and at its rear portion a handle portion; a movable handle pivoted at its one end to the head of the stationary handle and extending in opposed relation to the stationary handle so as to be grippable; a movable blade pivoted to the head of the stationary handle and having a cutting edge opposed to the receiving portion and a ratchet wheel portion opposed to the movable handle, the ratchet wheel portion including teeth arranged at specified spacing along its outer periphery; ratchet means including a drive pawl engageable with the ratchet wheel portion to intermittently drive the movable blade in a cutting direction when the movable blade is turned and a retaining pawl engageable with the ratchet wheel portion to prevent the movable blade from turning in a direction opposite to the cutting direction when the movable handle is turned; returning means including an elastic pulling member connected between the stationary handle portion and the movable blade for giving the movable blade a turning force in the opposite direction and a guide portion formed in the movable blade for shifting the end of the pulling member where the member is connected to the movable blade for suppressing the turning force on the movable blade while the force increases with the turn of the blade in the cutting direction, the guide portion being a bottomed groove formed in the movable blade and being so shiftable with the turn of the movable blade that one end of the guide portion positioned closer to the stationary handle portion than the other end thereof is brought to a position where said one end is more remote from the stationary handle portion than the other end, being movable from said one end of the guide portion to the other end thereof during the shift of the guide portion; and release means for disengaging the drive pawl and the retaining pawl from the ratchet wheel portion by the turn of the movable handle when the movable handle has turned in the opposite direction beyond the range of its cutting movement.

* * * * *